(12) United States Patent
Sandmann et al.

(10) Patent No.: US 8,408,631 B2
(45) Date of Patent: Apr. 2, 2013

(54) VEHICLE SEAT EASY ENTRY ASSEMBLY WITH POSITION MEMORY

(75) Inventors: Jörn Sandmann, Ennigerioh (DE); Sandra Frese, Verl (DE); Andre Schebaum, Steinhagen (DE); Hans-Peter Mischer, Bad Meinberg (DE); Michael Wojatzki, Ennigerloh (DE); Klaus Walter, Paderborn (DE); Marc Laumeier, Langenberg (DE)

(73) Assignee: Lear Corporation, Southfield, MI (US)

( * ) Notice: Subject to any disclaimer, the term of this patent is extended or adjusted under 35 U.S.C. 154(b) by 160 days.

(21) Appl. No.: 13/005,604

(22) Filed: Jan. 13, 2011

(65) Prior Publication Data

US 2011/0169294 A1 Jul. 14, 2011

Related U.S. Application Data

(60) Provisional application No. 61/294,749, filed on Jan. 13, 2010.

(51) Int. Cl.
*B60N 2/02* (2006.01)
(52) U.S. Cl. .................. 296/65.13; 296/65.01
(58) Field of Classification Search ............ 296/65.01, 296/65.13, 65.15; 248/424, 429
See application file for complete search history.

(56) References Cited

U.S. PATENT DOCUMENTS

| 4,189,957 A | 2/1980 | Gibig et al. |
| 4,712,759 A | 12/1987 | Sugama et al. |
| 4,730,804 A | 3/1988 | Higuchi et al. |
| 5,596,910 A | 1/1997 | Bauer et al. |
| 5,873,629 A | 2/1999 | Shuler |
| 6,098,946 A | 8/2000 | Sechet et al. |
| 6,113,051 A | 9/2000 | Moradell et al. |
| 6,231,022 B1 | 5/2001 | Becker et al. |
| 6,322,036 B1 | 11/2001 | Tame et al. |
| 6,354,553 B1 | 3/2002 | Lagerweij et al. |
| 6,637,712 B1 | 10/2003 | Lagerweij |

(Continued)

FOREIGN PATENT DOCUMENTS

| DE | 3042379 | 6/1982 |
| DE | 4242895 | 11/1993 |

(Continued)

*Primary Examiner* — Lori Lyjak
(74) *Attorney, Agent, or Firm* — MacMillan, Sobanski & Todd, LLC

(57) ABSTRACT

An adjustable memory track assembly for a vehicle seat has a lower rail adapted to be secured relative to a vehicle frame, and an upper rail adapted to support the seat for fore/aft sliding movement relative to the lower rail. The adjustable memory track assembly also has a track lock assembly operable via a first actuator between a locked, engaged state wherein relative movement between the lower and upper rails is resisted, and an unlocked, disengaged state wherein the seat can be slid to and then locked in a user-selected position. A memory module is operable via a second actuator to record the user-selected position. The second actuator is also operatively connected to disengage the track lock assembly to allow forward movement of the seat from the user-selected location to a forward location, and thereafter allow rearward movement of the seat back to, but not past, the user-selected location. The adjustable memory track assembly is characterized in that the memory module is provided with a blocking element to prevent rearward movement of the seat past the user-selected position independent of the locking state of the track lock assembly.

20 Claims, 4 Drawing Sheets

U.S. PATENT DOCUMENTS

| | | |
|---|---|---|
| 6,688,574 B2 | 2/2004 | Okazaki et al. |
| 6,726,282 B2 | 4/2004 | Gray |
| 6,799,800 B2 | 10/2004 | Klahold et al. |
| 6,874,747 B2 | 4/2005 | Oh |
| 6,892,995 B2 | 5/2005 | Tame et al. |
| 6,981,681 B2 | 1/2006 | Matsumoto |
| 7,066,521 B2 | 6/2006 | Jung et al. |
| 7,191,995 B2 | 3/2007 | Kim |
| 7,207,541 B2 | 4/2007 | Frounhaus et al. |
| 7,328,877 B2 | 2/2008 | Yamada et al. |
| 7,438,359 B2 | 10/2008 | Klahold et al. |
| 2005/0021319 A1 | 1/2005 | Li et al. |
| 2006/0053145 A1 | 3/2006 | Salminen et al. |
| 2006/0261237 A1 | 11/2006 | Noffz |
| 2007/0090263 A1 | 4/2007 | Yamada et al. |
| 2008/0163717 A1 | 7/2008 | Weber |
| 2009/0114793 A1 | 5/2009 | Brewer et al. |

FOREIGN PATENT DOCUMENTS

| | | | |
|---|---|---|---|
| DE | 4337293 | | 12/1994 |
| DE | 29723564 | | 11/1998 |
| EP | 0408932 | | 1/1991 |
| FR | 2919234 | | 1/2009 |
| GB | 2298785 A | * | 3/1995 |
| WO | WO03/009212 A1 | * | 7/2003 |
| WO | WO2005021319 | | 3/2005 |
| WO | WO2006053145 | | 5/2006 |

* cited by examiner

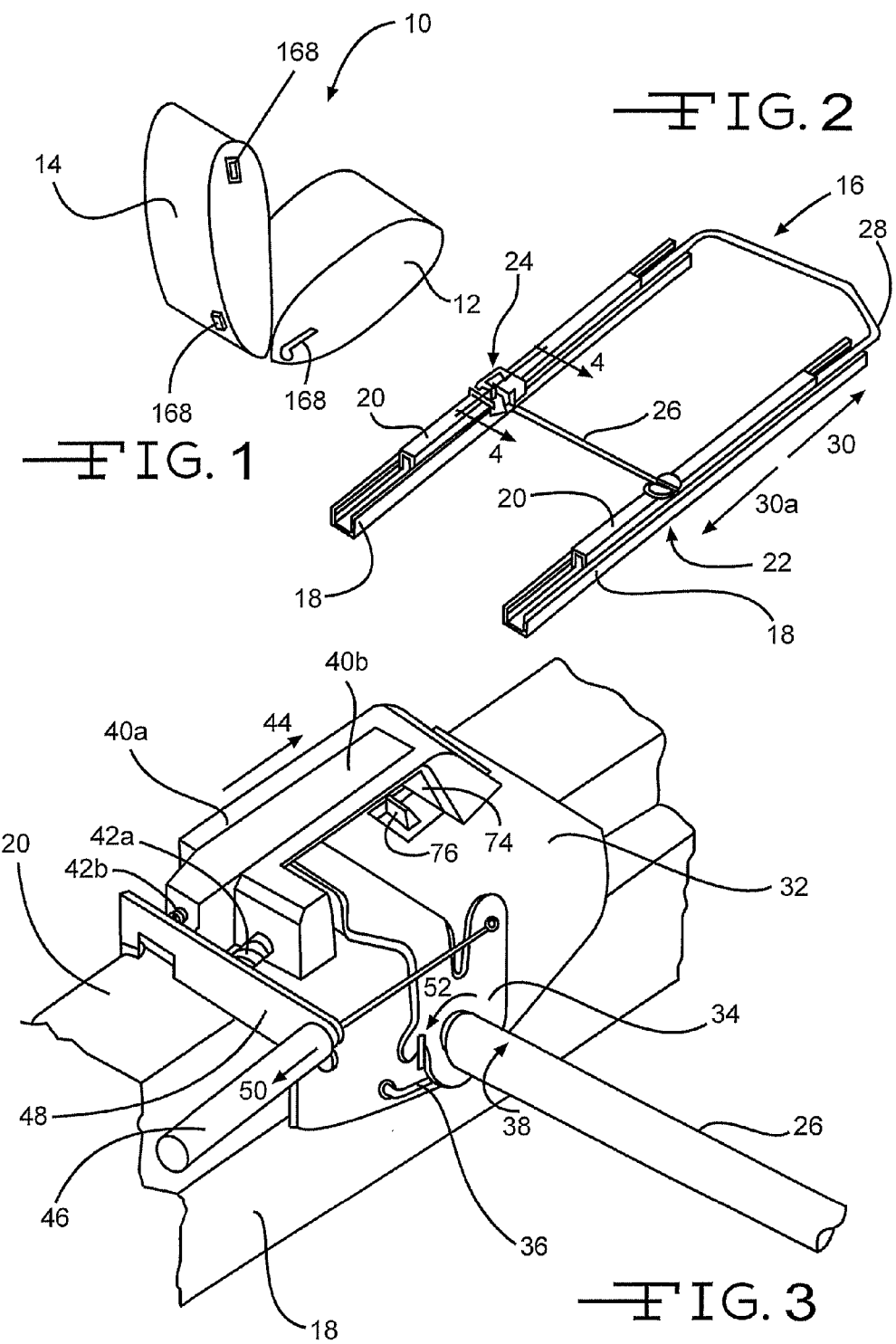

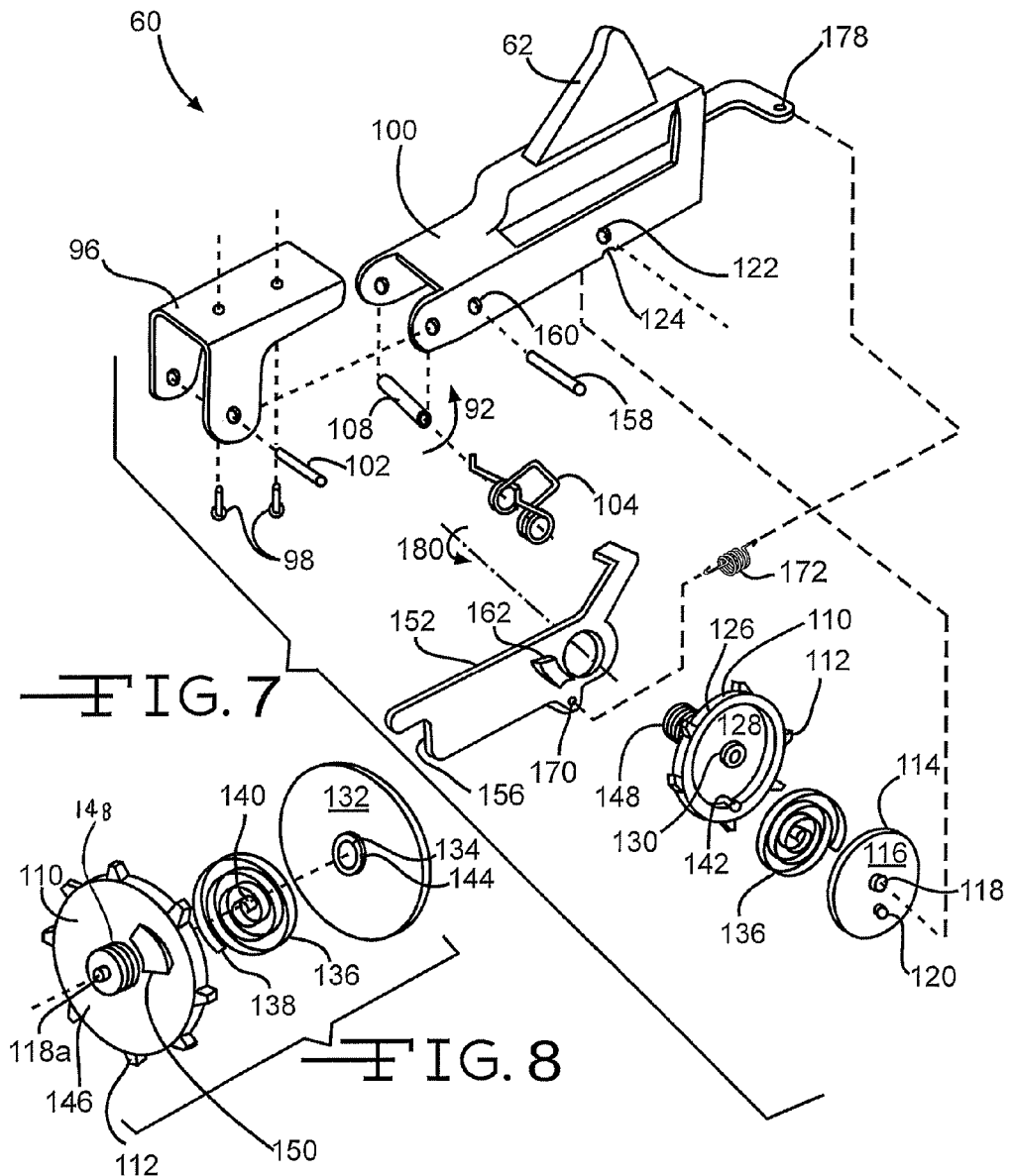

VEHICLE SEAT EASY ENTRY ASSEMBLY WITH POSITION MEMORY

CROSS-REFERENCE TO RELATED APPLICATIONS

This application claims the benefit of U.S. Provisional Application No. 61/294,749, filed Jan. 13, 2010, the disclosure of which is incorporated herein by reference.

BACKGROUND OF THE INVENTION

This invention relates in general to adjustable seats and in particular to vehicle seats whose position may be adjusted fore and aft. Vehicles such as passenger cars typically include seats for the use of the driver and other occupants. In many vehicles, the position of the seats may be adjusted for the comfort of the occupant. The options to adjust the position of a seat typically include the ability to move the seat in a fore and aft direction by operation of a track assembly which mounts the seat to the vehicle floor.

Some vehicles include the option of moving the seats in the first row in order to facilitate access to the second row. This is known as an easy entry option and is commonly seen in two-door vehicles. The easy entry allows the generally upright back portion of the seat to be dumped, or pivoted from its normal use position to a more forward position, in order to facilitate access to the space behind the seat. Additionally, the track assembly may be actuated so that the seat may be moved forward. Often, the seat is moved to its most forward position. This allows a person to more easily gain access to the space located behind the seat. When the seat no longer has to be in the dumped position, the seat back may be raised to its use position, and the seat may be moved back from its most forward position. This allows an occupant to comfortably sit in the seat.

An occupant of a seat will typically position that seat in the location that is most comfortable for him or her. When the seat is dumped, it is moved from that selected position. It is desirable that when the seat is raised from the dumped position that it return to the desired position that the user previously selected. This way the seat is in the location that is most comfortable for the occupant without the occupant having to adjust the seat again.

SUMMARY OF THE INVENTION

This invention relates to an adjustable memory track assembly for a vehicle seat. The track assembly has a lower rail adapted to be secured relative to a vehicle frame, and an upper rail adapted to support the seat for fore/aft sliding movement relative to the lower rail. The adjustable memory track assembly also has a track lock assembly operable via a first actuator between a locked, engaged state wherein relative movement between the lower and upper rails is resisted, and an unlocked, disengaged state wherein the seat can be slid to and then locked in a user-selected position. A memory module is operable via a second actuator to record the user-selected position. The second actuator is also operatively connected to disengage the track lock assembly to allow forward movement of the seat from the user-selected location to a forward location, and thereafter allow rearward movement of the seat back to, but not past, the user-selected location. The adjustable memory track assembly is characterized in that the memory module is provided with a blocking element to prevent rearward movement of the seat past the user-selected position independent of the locking state of the track lock assembly.

This invention further relates to an adjustable memory track assembly that includes a first rail and a second rail adapted for fore/aft sliding movement relative to the first rail. A track lock assembly is operable between a locked, engaged state wherein relative movement between the first and second rails is resisted, and an unlocked, disengaged state wherein relative movement between the first and second rails is not resisted. A memory module is operable to record a user-selected position. The memory module is provided with a blocking mechanism adapted to prevent movement of the second rail in the aft direction past the user-selected position independent of the locking state of the track lock assembly.

This invention further relates to an adjustable memory track assembly that includes a first rail and a second rail adapted for fore/aft sliding movement relative to the first rail. A track lock assembly is operable between a locked, engaged state wherein relative movement between the first and second rails is resisted, and an unlocked, disengaged state wherein relative movement between the first and second rails is not resisted. A memory module is operable to record a user-selected position. The memory module is provided with a blocking mechanism adapted to prevent movement of the second rail in the aft direction past the user-selected position independent of the locking state of the track lock assembly. The memory module includes a memory wheel mounted relative to one of the second rail and first rail. The memory wheel includes a plurality of teeth adapted to engage openings in a track mounted relative to the other of the second rail and first rail when the memory module is operated. At least one of the plurality of teeth adapted to support a load to prevent rearward movement of the second rail past the user-selected position. The memory module includes a threaded axle attached to the memory wheel and a memory nut that includes a threaded opening adapted to engage the threaded axle. The memory nut moves axially along the threaded axle when the seat is moved away from the user-selected location. The blocking element comprises a first memory surface mounted relative to the memory nut and a second memory surface mounted relative to the memory wheel. The first memory surface and the second memory surface are adapted so that the first memory surface is engaged with the second memory surface when the seat is at the user-selected position. The first memory surface is also engaged with the second memory surface when the seat is a prescribed distance from the user-selected position.

Various aspects of this invention will become apparent to those skilled in the art from the following detailed description of the preferred embodiment, when read in light of the accompanying drawings.

BRIEF DESCRIPTION OF THE DRAWINGS

FIG. 1 is a rear perspective view of a bucket-type seat.

FIG. 2 is a perspective view of a track assembly of the seat of FIG. 1.

FIG. 3 is a perspective view of a portion of the seat track assembly of FIG. 2, showing a latch assembly and an easy entry assembly.

FIG. 4 illustrates a track lock engaged and a memory module disengaged.

FIG. 5 illustrates the track lock disengaged and the memory module engaged.

FIG. 6 illustrates the memory module engaged and the seat moved forward of a memory point.

FIG. 7 is an exploded, perspective view of a portion of the memory module of FIGS. 4-6.

FIG. 8 is an exploded, perspective view of a portion of the memory module of FIG. 7, with the view taken from the opposite direction to illustrate details on the opposite sides of some components.

DETAILED DESCRIPTION OF THE PREFERRED EMBODIMENT

Figure 4:
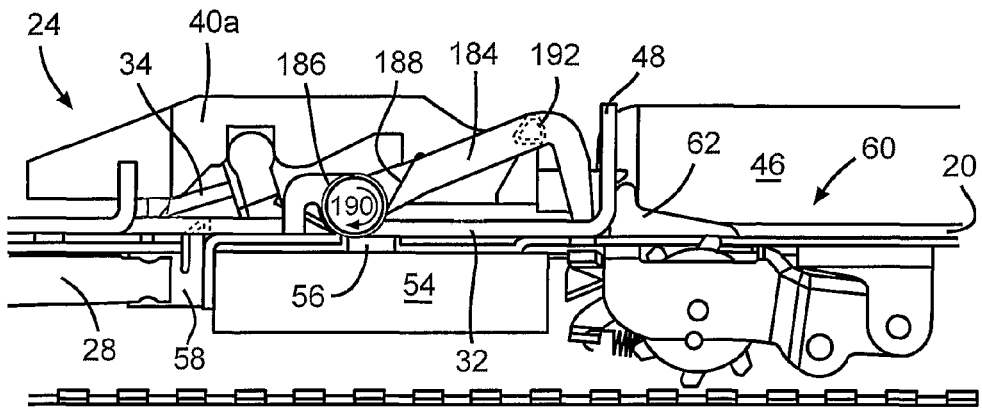
FIG. 4 is a cross sectional view taken along line 4-4 of FIG. 3.

Referring now to the drawings, there is illustrated in FIG. 1 a perspective view of a bucket seat 10. The illustrated bucket seat 10 is a type commonly installed in the front row of seats in passenger vehicles. The bucket seat 10 includes a seat portion 12 and a backrest 14. The seat portion 12 and the backrest 14 are typically cushioned and upholstered for aesthetics and the comfort of seat occupants. The seat portion 12 and the backrest 14 may be upholstered with leather, fabric, or other desired materials. The bucket seat 10 is used for illustrative purposes only, and may be sized to accommodate any number of occupants or may be a bench-type seat.

Referring now to FIG. 2, there is shown a track assembly 16. The track assembly 16 includes a pair of first rails 18 and a pair of second rails 20. The first rails 18 are secured relative to a floor or a frame of a vehicle (not shown). The second rails 20 are mounted relative to the seat portion 12 of the bucket seat 10. The second rails 20 are attached to the first rails 18 in order to allow the second rails 20 to move relative to the first rails 18 in the directions indicated by arrows 30 and 30a. This allows adjustment of the position of the bucket seat 10 in the vehicle. It should be appreciated that within the vehicle, this allows fore-and-aft movement of the second rails 20 relative to the first rails 18. However, the track assembly 16 may be adapted to allow relative movement in some other direction, if desired.

The track assembly 16 includes a catch assembly, indicated generally at 22, mounted relative to one of the second rails 20. The seat track assembly also includes a catch and memory assembly, indicated generally at 24, mounted relative to the other of the second rails 20. The catch assembly 22 and the catch and memory assembly 24 are adapted to selectively lock or prevent movement of the respective second rail 20 relative to the respective first rail 18, as will be described below. The catch assembly 22 and the catch and memory assembly 24 are operatively connected by a connection tube 26. The connection tube 26 is adapted to help the catch assembly 22 and the catch and memory assembly 24 to selectively lock in unison.

The catch assembly 22 and the catch and memory assembly 24 are also operatively connected by a comfort adjustment bar 28. The comfort adjustment bar is adapted to allow an occupant of the seat to selectively unlock or release the catch assembly 22 and the catch and memory assembly 24 in order to allow the occupant to adjust the position of the seat. The comfort adjustment bar 28 is a first actuator used to manually operate the catch assembly 22 and the catch and memory assembly 24. The catch assembly 22 and the catch and memory assembly 24 will be described in detail below.

Referring to FIG. 3, a detailed perspective view of the catch and memory assembly 24 is shown. The catch and memory assembly 24 includes a support bracket 32. The illustrated support bracket 32 is made of steel and is welded to the second rail 20; however, the support bracket 32 may be made of other desired materials, and may be attached to the second rail 20 by other desired fasteners, such as by pins, rivets, adhesives, or threaded fasteners. The catch and memory assembly 24 also includes an activation bracket 34. The activation bracket is mounted for pivotal movement relative to the support bracket 32. The connection tube 26 is fixed relative to the support bracket 32. The activation bracket 34 may be fixed to the connection tube 26 by any desired fasteners, including welding, pins, rivets, adhesives, or threaded fasteners. A spring 36 is adapted to provide a force to bias the activation bracket relative to the support bracket in the direction indicated by the arrow 38.

The catch and memory assembly 24 also includes a track lock sled or a first sled 40a and a memory lock sled or a second sled 40b. The first sled 40a and the second sled 40b are mounted for sliding movement relative to the support bracket 32. A first sled spring 42a is adapted to bias the first sled 40a relative to the support bracket 32 in the direction indicated by the arrow 44. A second sled spring 42b is adapted to bias the second sled 40b relative to the support bracket 32 in the direction indicated by the arrow 44.

The catch and memory assembly 24 is operatively connected to the backrest 14 by a Bowden cable 46. The Bowden cable 46 is a second actuator used to operate the catch assembly 22 and the catch and memory assembly 24. The Bowden cable 46 is supported by the support bracket 32 by a support flange 48. When the backrest 14 is dumped, or pivoted from a generally upright use position to a more forward position in order to facilitate access to a space behind the bucket seat 10, the Bowden cable 46 applies a force to the activation bracket 34 in the direction indicated by the arrow 50. The force 50 applied by the Bowden cable 46 is sufficient to overcome the biasing force of the spring 36. Therefore, when the backrest 14 is dumped, the activation bracket 34 is rotated in an activation direction, indicated by arrow 52. The effects of this will be explained in reference to the following figures.

Referring now to FIG. 4, a cross sectional view of the catch and memory assembly 24 is shown. FIG. 4 illustrates the catch and memory assembly 24 when the backrest 14 is in its raised position. The activation bracket 34 is shown in a disengaged position. In addition to the components previously described, the catch and memory assembly 24 includes a track lock assembly, shown schematically at 54. The track lock assembly 54 will not be described in detail, but may include any desired assembly that can releasably prevent relative movement between the first rail 18 and the second rail 20. When the track lock assembly 54 is engaged, it prevents movement of the second rail 20 relative to the first rail 18. The track lock assembly 54 includes a lock activation pin 56. The lock activation pin 56 may be actuated to disengage the track lock assembly 54. The track lock assembly 54 also includes a lock activation member 58 operatively connected to the comfort adjustment bar 28. The lock activation member 58 may be actuated to disengage the track lock assembly 54, thereby permitting fore and aft movement of the bucket seat 10. The lock activation pin 56 and the lock activation member 58 are shown in their respective non-actuated positions in FIG. 4. Therefore, the track lock assembly 54 is engaged in FIG. 4 and the second rail 20 is unable to move relative to the first rail 18.

The catch and memory assembly 24 also includes a memory module, indicated generally at 60. The memory module 60 includes a memory activation pin 62. The memory activation pin 62 may be actuated to engage the memory module 60. The operation of the memory module 60 will be described in detail below.

The catch and memory assembly 24 also includes a sled block 184. The sled block 184 is mounted to pivot relative to the support bracket 32 about a block pivot 186. A block spring 188 is adapted to bias the sled block 184 in a blocking direction, indicated by arrow 190. A protrusion 192 on the sled block 184 is adapted to engage with the first sled 40a in order to prevent movement of the sled block 184 in the direction indicated by arrow 190 beyond the position shown in FIG. 4.

Figure 5:
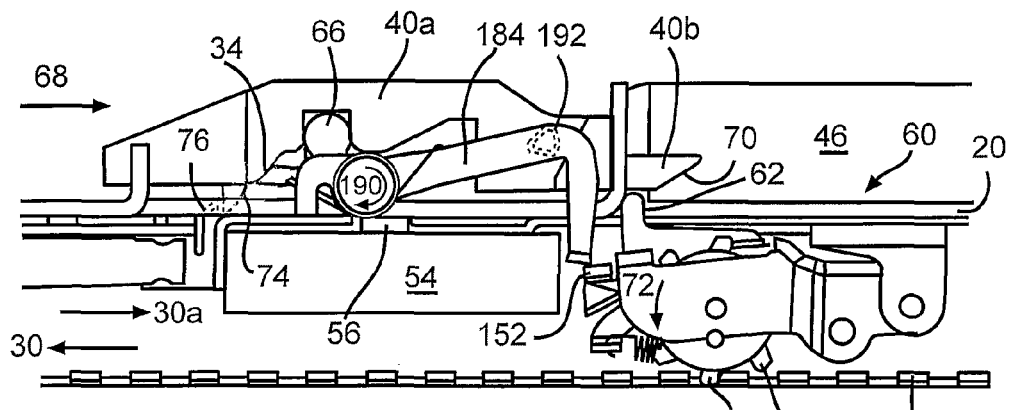
FIG. 5 is a cross sectional view similar to that shown in FIG. 4.

Referring now to FIG. 5, a cross sectional view similar to that shown in FIG. 4 is illustrated. The catch and memory assembly 24 is shown in the configuration it is in when the backrest 14 has been dumped. As shown in FIG. 5, the Bowden cable 46 has applied a force to the activation bracket 34 and the activation bracket 34 has been rotated in the activation direction 52 (as shown in FIG. 3). The activation bracket 34 is shown in an engagement position. The activation bracket 34 is adapted to engage the lock activation pin 56 when the activation bracket 34 is in the engagement position. Thus, the activation bracket 34 actuates the lock activation pin 56 causing the track lock assembly 54 to disengage.

The activation bracket 34 also includes a sled engagement surface 66. The sled engagement surface 66 is adapted to move the first sled 40a when the activation bracket 34 is in the engagement position. The sled engagement surface 66 applies a force to the first sled 40a sufficient to overcome the biasing force of the first sled spring 42a (shown in FIG. 3). Thus, the sled engagement surface 66 moves the first sled 40a to a sled activated position, in the direction indicated by arrow 68. The first sled 40a is adapted so that when the first sled 40a is moved to the activated position, is moves the second sled 40b to an activated position, also in the direction indicated by the arrow 68. It should be appreciated that the second sled 40b is moved against the force of the second sled spring 42b (shown in FIG. 3). The first sled 40a and the second sled 40b are shown in their respective activated positions in FIG. 5.

The second sled 40b includes a memory engagement surface 70. The memory engagement surface 70 is adapted to engage the memory activation pin 62 when the second sled 40b is in the activation position. When the memory activation pin 62 is engaged, the memory module 60 is moved to a memory activation position, in the direction indicated by arrow 72. The operation of the memory module 60 will be described in detail below.

The second sled 40b also includes a sled catch 74. The sled catch 74 is adapted to interoperate with a sled lock 76 in order to releasably lock the second sled 40b in the activated position. The illustrated sled catch 74 is an integral component of the plastic second sled 40b and the illustrated sled lock 76 is a plastic piece that is fixed relative to the comfort adjustment bar 28. It should be appreciated that the comfort adjustment bar is movable upwards and downwards (as viewed in FIG. 5) and is biased in the upwards direction, therefore, the sled lock 76 is also movable. The sled lock 76 may be made of other desired materials, such as metal, and may not be connected to the comfort adjustment bar 28, if desired. The sled catch 74 and the sled lock 76 include cam surfaces adapted so that the sled lock 76 is pushed downward when the second sled 40b moves in the direction indicated by the arrow 68. This allows the second sled 40b to move into the activated position. The sled catch 74 and the sled lock 76 further include engaging surfaces that prevent the second sled 40b from moving away from the activated position. It should be appreciated that while one embodiment of the sled catch 74 and the sled lock 76 has been described, the sled catch 74 and the sled lock 76 may be made of other materials, and may be designed to interact in a manner other than that specifically illustrated, if desired.

When the first sled 40a is in the activated position, the sled block 184 is no longer engaged with the first sled 40a. The sled block 184 is therefore biased further in the direction indicated by the arrow 190 by the block spring 188. The sled block 184 will move in the direction indicated by the arrow 190 until the sled block 184 engages with a memory nut 152 of the memory module 60. The memory nut 152 will be described in detail below.

Referring now to FIG. 7, there is shown an exploded, perspective view of the memory module 60. The memory module 60 includes a memory mounting bracket 96 that is adapted to be attached to the second rail 20 by rivets 98. The memory mounting bracket 96 may be attached to the second rail 20 by other desired fasteners, such as by pins, adhesives, threaded fasteners, or by welding. The memory module 60 also includes a memory arm 100. The memory arm 100 is attached for pivoting movement relative to the memory mounting bracket 96 by a pivot shaft 102. The memory module 60 includes a memory spring 104 that biases the memory arm 100 in a memory deactivation direction, indicated by the arrow 92. The illustrated memory spring 104 is a coil spring disposed around a sleeve 108 that is placed around the pivot shaft 102. It should be appreciated that the memory spring 104 may be any desired biasing member, such as a resilient member or a counter weight.

The memory activation pin 62 is attached to the memory arm 100. It should be appreciated that when the second sled 40b is moved to the activated position (as shown in FIG. 5) the memory arm 100 is moved to the memory activation position (as indicated by the arrow 72 in FIG. 5) over the biasing force of the memory spring 104.

In further reference to FIG. 7, the memory module 60 includes a memory wheel 110. The memory wheel 110 is mounted for pivotal movement relative to the memory arm 100. The memory wheel includes a plurality of teeth 112. The illustrated memory wheel 110 is a metal wheel with a plastic over mold. It should be appreciated that the memory wheel 110 may be made of other desired materials.

The memory module 60 also includes a face place 114. A first side 116 of the face plate 114 includes an axle 118 and a stub 120. The axle 118 is adapted to be held in an axial opening 122 defined on the memory arm 100. The stub 120 is adapted to be held in a stub opening 124 defined on the memory arm 100. Therefore, the face plate 114 is fixed relative to the memory arm 100.

A first side 126 of the memory wheel 110 includes a spring space 128. A wheel hub 130 is located at the axis of the memory wheel 110 within the spring space 128. As shown in reference to FIG. 8, a second side 132 of the face plate 114 includes a face plate hub 134. The face plate hub 134 is adapted to cooperate with the wheel hub 130 to allow the memory wheel 110 to rotate relative to the face plate 114 when the memory module 60 is assembled. The face plate 114 fits onto the memory wheel 110 such that the face plate 114 covers the spring space 128.

The memory wheel 110 also includes a clock spring 136. The clock spring 136 is located within the spring space 128. The clock spring 136 includes a first end 138 and a second end 140. The first end 138 of the clock spring 136 is fixed relative to the memory wheel 110 at a wheel attachment point 142. The second end 140 of the clock spring 136 is fixed relative to the face plate 114 at a face plate attachment point 144. The operation of the clock spring 136 will be described in detail below.

As shown in FIG. 8, a second side 146 of the memory wheel 110 includes a threaded axle 148. The threaded axle 148 is coaxial with the center of the memory wheel 110. A second axle 118a is located on the end of the threaded axle 148, and is coaxial with the axle 118. The second axle 118a is adapted to be held by the memory arm 100 in order to allow rotation of the memory about the axle 118 and the second axle 118a. Alternatively, the axle 118 and the second axle 118a may be replaced by a single axle that passes through the memory wheel 110. The second side 146 of the memory wheel 110 also includes a wheel end stop 150. The wheel end stop 150 is a raised face generally perpendicular to the second side 146 of the memory wheel 110. The wheel end stop 150 is generally parallel with the axis of the memory wheel 110. It should be appreciated that the wheel end stop 150 may have a different configuration or orientation from that illustrated. Also, the memory wheel 110 may include more than one wheel end stop 150. For example, there may be two wheel end stops located on the same diameter of the second side 146 but on opposite sides of the threaded axle 148. The function of the memory wheel end stop 150 will be described below.

Referring back to FIG. 7, the memory module 60 also includes a memory nut 152. The memory nut 152 is a molded metal piece, but may be made of other desired material and methods. The memory nut 152 includes a threaded opening 154 that is adapted to fit onto the threaded axle 148 of the memory wheel 110. The memory nut 152 also includes a stop hook 156 that is adapted to engage a stop shaft 158. The memory nut 152 is able to slide freely along the stop shaft 158. The stop shaft 158 is adapted to be fixed relative to the memory arm 100 at a stop mount 160.

The memory nut 152 also includes a nut end stop 162. The nut end stop 162 is a raised face generally perpendicular to memory nut 152. The nut end stop 162 is generally parallel with the axis of the threaded opening 154. It should be appreciated that the nut end stop 162 may have a different configuration or orientation from that illustrated. Also, the memory nut 152 may include more than one nut end stop 162. There may be one nut end stop 162 to complement each wheel end stop 150, although this is not required. The function of the nut end stop 162 will be described below.

When the memory module 60 is assembled, the face plate 114 is secured relative to the memory arm 100 by the axle 118 and the stub 120. The memory wheel 110 is connected for rotational movement relative to the face plate 114 by the cooperation of the wheel hub 130 and the face plate hub 134. An outer end 164 of the threaded axle 148 is supported by rotational movement by the memory arm 100. The memory nut 152 is supported by the threaded axle 148 and the stop shaft 158. It should be appreciated that the memory nut 152 is able to rotate relative to the threaded axle 148, but the stop hook 156 will engage the stop shaft 158 to limit the range of motion of the memory nut 152. The memory nut 152 includes a nut spring hole 170 that is adapted to hold one end of a nut spring 172. The nut spring 172 is also attached to the memory arm 100 of the memory module 60a at an arm spring hole 178. The nut spring 172 provides a force that biases the memory nut 152 to rotate about the threaded axle 148 in a direction indicated by the arrow 180. It should be appreciated that rotation of the memory nut 152 is prevented when the stop hook 156 engages with the stop shaft 158.

The memory module 60 is configured so that, as the memory wheel 110 rotates, the memory nut 152 slides along the threaded shaft 148 and the stop shaft 158. The memory nut will then move farther from or closer to the memory wheel 110 depending on which direction the memory wheel 110 is turning. The memory nut 152 is able to approach the memory wheel 110 until the nut end stop 162 engages the wheel end stop 150. The engagement of these two faces prevents the memory nut 152 from moving any closer to the memory wheel 110. It should be appreciated that this also prevents further rotation of the memory wheel 110 in the direction that would cause the memory nut 152 to approach the memory wheel 110. Therefore, the memory nut 152 acts as a blocking mechanism to prevent rotation of the memory wheel 110 in a particular direction beyond a particular point. When the nut end stop 162 engages the wheel end stop 150, the memory module 60 is said to be in the zero position. The clock spring 136 is pre tensioned when the memory module is in the zero position, although this is not necessary.

Referring back to FIG. 5, when the memory module 60 is activated, the memory wheel 110 is moved so that at least one of the teeth 112 engages with openings in a track 166. The location of the second rail 20 relative to the first rail 18 when the memory module 60 is activated is the memory point. When first rail 18 and the second rail 20 are in these relative positions, the memory module 60 is in the zero position. When the second rail 20 is moved in the direction indicated by the arrow 30, the engagement of the teeth 112 with the track 166 causes the memory wheel 110 to rotate. The rotation of the memory wheel 110 causes rotation of the threaded axle 148. The rotation of the threaded axle 148 will cause rotation of the memory nut 152. The memory nut 152 will rotate along with the threaded axle 148 until the memory nut engages the memory arm 100.

Figure 9:
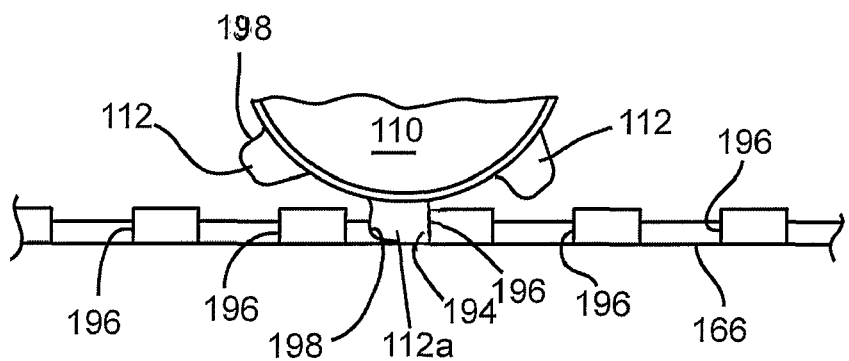
FIG. 9 is a side view of teeth of a memory wheel engaged with a track.

Referring to FIG. 9, a side view of the teeth 112 engaged with the openings in the track 166 is shown. In the position shown in FIG. 9, the memory module is in the zero position and at the memory point. As can be seen, one of the plurality of teeth 112 is a stop tooth 112a. The stop tooth 112a includes a tooth stop surface 194 that is adapted to engage with one of a plurality of track stop surfaces 196 on the track 166. In the illustrated embodiment, the tooth stop surface 194 and the track stop surfaces 196 are planar surfaces; however, these surfaces may have other desired shapes. In the illustrated embodiment, only one of the plurality of teeth 112 is a stop tooth 112a. The rest of the plurality of teeth 112 do not include the tooth stop surface 194. Alternatively, more than one of the plurality of teeth 112 may include the tooth stop surface 194, if desired. It should be appreciated that each track stop surface 196 corresponds to a position that may be the user-selected position. The spacing between the track stop surfaces 194 corresponds to the adjustment increment of the track lock assembly 54. Therefore, in all positions that the track lock assembly 54 can lock the second rail 20 relative to the first rail 18, one of the track stop surfaces 196 is available to engage the tooth stop surface 194.

Figure 10:
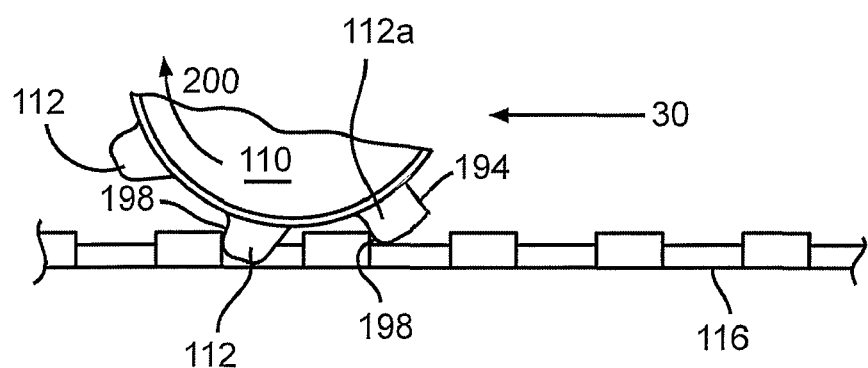
FIG. 10 is a side view similar to that shown in FIG. 9, when the memory wheel has been moved relative to the track.

Referring to FIG. 10, a view similar to that shown in FIG. 9 is illustrated, when the memory wheel 110 has been moved in the direction indicated by the arrow 30. Each of the plurality of teeth 112 includes a leading edge 198. As the memory wheel 110 moves, leading edge 198 engages with the track 166, causing the memory wheel 110 to rotate. The clock spring 136 provides a biasing force on the memory wheel 110 in the direction indicated by the arrow 200. As a result, only the leading edges 198 of the teeth 112 drive rotation of the memory wheel 110. When the memory wheel 110 is moved in the direction indicated by the arrow 30a, the leading edge 198 will remain engaged with the track 166 as the memory wheel 110 rotates. Referring back to FIGS. 7 and 8, it should be appreciated that when the wheel end stop 150 engages the nut end stop 162, the memory wheel 110 will no longer rotate, either due to engagement with the track 166 or due to the biasing force of the clock spring 136. Therefore, as shown in FIG. 9, the tooth stop surface 194 will engage the track stop surface 196 as the memory wheel 110 moves in the direction indicated by the arrow 30a, and further movement of the memory wheel in the direction 30a is prevented.

Figure 6:
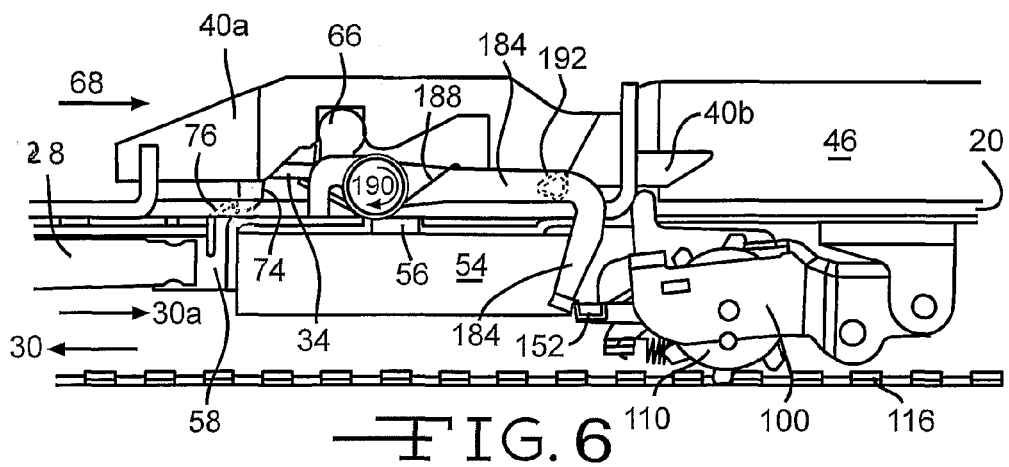
FIG. 6 is a cross sectional view similar to that shown in FIG. 5.

Referring now to FIG. 6, a cross sectional view similar to that shown in FIG. 5 is illustrated. The catch and memory assembly 24 is shown in the configuration it is in when the second rail 20 have been moved relative to the first rail 18 a prescribed distance in the direction indicated by the arrow 30. In this illustrated embodiment, the prescribed distance is within the range of approximately 3 millimeters to 6 millimeters. However, the prescribed distance may be greater or less, if desired. As shown, the rotation of the memory nut 152 allows the sled block 184 to be moved further in the direction indicated by the arrow 190 by the block spring 188. The sled block 184 will move in the direction indicated by the arrow 190 so that the sled block 184 remains engaged with the memory nut 152.

At this point, the memory nut 152 is unable to rotate further with threaded axle 148. If the second rail 20 is moved relative to the first rail 18 in the direction indicated by the arrow 30, the memory nut 152 will remain in its position relative to the memory arm 100 and will rotate relative to the threaded axle 148. This will cause the memory nut 148 to move away from the memory wheel 110, as previously described in reference to FIGS. 7 and 8. It should be appreciated that the memory wheel 110 is also rotating relative to the face plate 114. As a result, the clock spring 136 is wound more tightly as the memory nut 152 is moved further from the memory wheel 110.

In the position illustrated in FIG. 6, the backrest 14 of the seat 10 has been dumped, and the seat 10 has been moved in the forward direction in order to provide easier access to the space behind the seat 10. As shown, the track lock assembly 54 remains disengaged because the activation bracket 34 continues to actuate the lock activation pin 56. Thus, relative movement between the first rail 18 and the second rail 20 is possible. If the backrest 14 is raised when the catch and memory assembly 24 is in this position, then the Bowden cable 46 will no longer apply a force to the activation bracket 34. However, the activation bracket 34 will remain in the position shown in FIG. 6. Rotation of the activation bracket 34 relative to the support bracket 34 is constrained because the engagement surface 66 of the activation bracket 34 is engaged with the first sled 40a. The first sled 40a locked in the activated position by the sled block 184. As shown, the protrusion 192 of the sled block 184 is engaged with the first sled 40a, and prevents movement of the first sled 40a away from the activated position. As a result, the activation bracket 34 remains in its activated position, and the track lock assembly 54 remains disengaged.

When the seat 10 is moved in the direction indicated by arrow 30a back toward the memory point, the memory wheel 110 will be rotated in the opposite direction and the memory nut 152 will be moved back toward the memory wheel 110. When the seat is approximately 3 to 6 millimeters from the memory point, the catch and memory assembly 24 will be in the configuration shown in FIG. 6. It should be appreciated that at this point, the end stop 150 of the memory wheel 110 and the nut end stop 162 of the memory nut (seen in FIGS. 7 and 8) are in contact with each other. At this point, the memory nut 152 is unable to move any closer to the memory wheel 110. As the seat 10 is moved further toward the memory point, the memory nut 152 therefore rotates along with the memory wheel 110. The memory nut 152 rotates until the stop hook 156 engages the stop shaft 158. At this point, the memory module 60 is in the zero position. It should be appreciated that when the memory nut 152 is rotated, it also rotates the sled block 184 to the position illustrated in FIG. 5. At this point, the protrusion 192 of the sled block 184 is no longer engaged with the first sled 40a, and the first sled 40a may be moved away from the activated position in the direction 44 by the first sled spring 42a (as described and shown above in reference to FIG. 3). Thus, the activation bracket 34 is also able to move out of its activated position, and will no longer actuate the activation pin 56. Therefore, the track lock assembly 54 will engage and will prevent further relative movement between the first rail 18 and the second rail 20. The seat 10 is now locked in the memory position.

It should be appreciated that the second sled 40b remains in its activated position, due to the engagement of the sled catch 74 and the sled lock 76. Therefore, the memory module 60 remains in its activated position.

The seat occupant may use the comfort adjustment bar 28 in order to adjust the position of the seat 10 in the vehicle. The comfort adjustment bar 28 is adapted so that use of the comfort adjustment bar will disengage the track lock assembly 54. This allows the occupant to move the second rail 20 relative to the first rail 18. The comfort adjustment bar 28 is also adapted so that use of the comfort adjustment bar will disengage the sled lock 76 and the sled catch 74. Thus, the second sled 40b is no longer locked in its activated position, and the second sled 40b will be moved away from its activated position by the second sled spring 42b (shown in FIG. 3). When the second sled 40b is no longer in its activated position, it no longer engages the memory activation pin 62 and the catch and memory assembly is in the configuration illustrated in FIG. 4. The memory module is able to return to a non-activated state. Thus, the seat may be moved both forward and backward without being blocked by the memory module.

Operation of the bucket seat 10 will now be described in order to clarify the operation of the track assembly 16 and the catch and memory assembly 24. An occupant of the bucket seat 10 may use the comfort adjustment bar 28 to release the track lock assembly 54. Use of the comfort adjustment bar 28 also releases the second sled 40b, and sets the memory module 60 to the zero position. This allows the occupant to move the bucket seat 10 fore and aft to a user-selected position. When the bucket seat 10 is at the user-selected position, the comfort adjustment bar 28 is released and the track lock assembly 54 engages.

As shown in FIG. 1, the illustrated bucket seat 10 may include a number of handles 168. The handles 168 are included for illustrative purposes only, and are representative of various non-limiting options for actuating the mechanism (not shown) used to move the backrest to the dumped position. When a user wishes to gain access to the space behind the bucket seat 10, one of the handles 168 may be used to actuate the easy entry. The handle 168 releases the backrest 14, allowing it to move from its use position to a more forward, easy entry position. It should be appreciated that using the handle may cause the backrest 14 to be dumped or biased toward the easy entry position, or may require the user to move it manually to the easy entry position. The movement of the backrest 14 to the easy entry position causes the Bowden cable 46 (shown in FIG. 3) to apply a force to the activation bracket 34. This force causes the activation bracket 34 to rotate in the direction 52.

Referring now to FIG. 4, the activation bracket 34 is shown in this rotated state. Rotation of the activation bracket 34 depresses the lock activation pin 56, which disengages the track lock assembly 54. It should be appreciated that the bucket seat 10 may be biased in a forward direction, in order to facilitate access to the space behind the bucket seat 10.

Rotation of the activation bracket 34 also moves the first sled 40a in the direction 68 to its activated position. The first sled 40a in turn moves the second sled 40b to its activated position. The second sled 40b activates the memory module 60 and causes the memory wheel 110 to engage the track 166. The activation of the memory module 60 records the user-selected position or the memory point of the bucket seat 10. The bucket seat 10 may now be moved in the forward direction, indicated by arrow 30.

It should be appreciated that the bucket seat 10 cannot be moved in the aft direction, because movement in that direction is blocked by the memory module 60. If an attempt is made to move the bucket seat 10 in the rearward direction, the tooth 112 of the memory wheel 110 will engage with the track 116, and a force will be applied to turn the memory wheel 110. However, the end stop 150 of the memory wheel 110 is engaged with the nut end stop 162 of the memory nut. This acts as the blocking mechanism to prevent further rotation of the memory wheel 110. Therefore, the memory module 60 prevents rearward movement of the bucket seat 10. Because the teeth 112 of the memory wheel 110 are engaged with the track 166, the rearward force will be supported by at least one of the teeth 112 of the memory wheel. It should be appreciated that the memory module 60 only prevents rearward movement past the user-selected position, and the bucket seat 10 may be moved forward of the user-selected position, and rearward up to the user-selected position, without that movement being prevented by the memory module 60.

When it is desired to return the bucket seat 10 to its original posture, the backrest 14 is raised to its use position. When the backrest 14 is raised to its use position and the seat is returned to the memory point. At this point, the first memory sled is no longer held in its activated position by either the activation bracket 34 or the sled block 184. Therefore, the first sled 40a and the activation bracket 34 both move out of their respective activated positions and the track lock assembly 54 engages, preventing further movement of the bucket seat.

It should be appreciated that while the memory module 60 and the catch and memory assembly 24 have been described for use with a particular seat track assembly, the memory module 60 or the catch and memory assembly 24 may be used with any desired track assembly.

The principle and mode of operation of this invention have been explained and illustrated in its preferred embodiment. However, it must be understood that this invention may be practiced otherwise than as specifically explained and illustrated without departing from its spirit or scope.

What is claimed is:

1. An adjustable memory track assembly, the track assembly having a first rail adapted to be secured relative to a frame, and a second rail adapted for fore/aft sliding movement relative to the first rail; a track lock assembly operable via a first actuator between a locked, engaged state wherein relative movement between the first and second rails is resisted, and an unlocked, disengaged state wherein the second rail can be slid to and then locked in a user-selected position; a memory module operable via a second actuator to record the user-selected position, the memory module including a memory wheel mounted relative to one of the second rail and first rail, the memory wheel including a plurality of teeth, the teeth adapted to engage openings in a track mounted relative to the other of the second rail and first rail when the memory module is operated; the second actuator operatively connected to disengage the track lock assembly to allow forward movement of the second rail from the user-selected location to a forward location, and thereafter allow rearward movement of the second rail back to, but not past, the user-selected location; characterized in that
the memory module is provided with a blocking mechanism adapted to prevent rotation of the memory wheel to prevent rearward movement of the second rail past the user-selected position independent of the locking state of the track lock assembly.

2. The adjustable memory track assembly of claim 1, further characterized in that at least one of the plurality of teeth of the memory wheel is adapted to support a load to prevent rearward movement of the second rail past the user-selected position.

3. The adjustable memory track assembly of claim 2, further characterized in that the memory module is located within an interior space of one of the first rail and the second rail.

4. The adjustable memory track assembly of claim 3, further characterized in that the second actuator is activated when a backrest portion of a seat is moved from a use position to an easy entry position.

5. The adjustable memory track assembly of claim 4, further characterized in that the second actuator is deactivated when the track lock assembly is switch to the disengaged state using the first actuator.

6. The adjustable memory track assembly of claim 5, further characterized in that the memory module includes a threaded axle attached to the memory wheel; the memory module includes a memory nut that includes a threaded opening, the threaded opening adapted to engage the threaded axle; wherein the memory nut moves axially along the threaded axle when the seat is moved away from the user-selected location.

7. The adjustable memory track assembly of claim 6, further characterized in that the blocking element comprises a first memory surface mounted relative to the memory nut, a second memory surface mounted relative to the memory wheel, and wherein the first memory surface is engaged with the second memory surface when the seat is at the user-selected position.

8. The adjustable memory track assembly of claim 7, further characterized in that the first memory surface is engaged with the second memory surface when the seat is a prescribed distance from the user-selected position.

9. The adjustable memory track assembly of claim 7, further comprising a memory lock mounted relative to the memory module, the memory lock operable via the second actuator to activate the memory module, the memory lock operable via the first actuator to deactivate the memory module.

10. The adjustable memory track assembly of claim 2, further characterized in that at only one of the plurality of teeth of the memory wheel is adapted to support a load to prevent rearward movement of the second rail past the user-selected position.

11. The adjustable memory track assembly of claim 1, further characterized in that the memory module includes a threaded axle attached to the memory wheel, and the memory module includes a memory nut that includes a threaded opening adapted to engage the threaded axle;
wherein the memory nut moves axially along the threaded axle when the seat is moved away from the user-selected location.

12. The adjustable memory track assembly of claim 11, further characterized in that the blocking element comprises a first memory surface mounted relative to the memory nut, and a second memory surface mounted relative to the memory wheel;
  wherein the first memory surface is engaged with the second memory surface when the seat is at the user-selected position.

13. The adjustable memory track assembly of claim 12, further characterized in that the first memory surface is engaged with the second memory surface when the seat is a prescribed distance from the user-selected position.

14. The adjustable memory track assembly of claim 13, further comprising a memory lock mounted relative to the memory module, the memory lock operable via the second actuator to activate the memory module, the memory lock operable via the first actuator to deactivate the memory module.

15. An adjustable memory track assembly, comprising:
  a first rail and a second rail adapted for fore/aft sliding movement relative to the first rail;
  a track lock assembly operable between a locked, engaged state wherein relative movement between the first and second rails is resisted, and an unlocked, disengaged state wherein relative movement between the first and second rails is not resisted; and
  a memory module operable to record a user-selected position, the memory module provided with a blocking mechanism adapted to prevent movement of the second rail in the aft direction past the user-selected position independent of the locking state of the track lock assembly.

16. The adjustable memory track assembly of claim 15, wherein the memory module includes a memory wheel mounted relative to one of the second rail and first rail, the memory wheel includes a plurality of teeth adapted to engage openings in a track mounted relative to the other of the second rail and first rail when the memory module is operated, and at least one of the plurality of teeth is adapted to support a load to prevent rearward movement of the second rail past the user-selected position.

17. The adjustable memory track assembly of claim 16, further characterized in that at only one of the plurality of teeth of the memory wheel is adapted to support a load to prevent rearward movement of the second rail past the user-selected position.

18. The adjustable memory track assembly of claim 16, wherein the memory module includes a threaded axle attached to the memory wheel and a memory nut that includes a threaded opening adapted to engage the threaded axle;
  wherein the memory nut moves axially along the threaded axle when the seat is moved away from the user-selected location; and
  wherein the blocking element comprises a first memory surface mounted relative to the memory nut and a second memory surface mounted relative to the memory wheel, adapted so that the first memory surface is engaged with the second memory surface when the seat is at the user-selected position.

19. The adjustable memory track assembly of claim 18, wherein the first memory surface is engaged with the second memory surface when the seat is a prescribed distance from the user-selected position.

20. An adjustable memory track assembly, comprising:
  a first rail and a second rail adapted for fore/aft sliding movement relative to the first rail;
  a track lock assembly operable between a locked, engaged state wherein relative movement between the first and second rails is resisted, and an unlocked, disengaged state wherein relative movement between the first and second rails is not resisted; and
  a memory module operable to record a user-selected position, the memory module provided with a blocking mechanism adapted to prevent movement of the second rail in the aft direction past the user-selected position independent of the locking state of the track lock assembly, the memory module including a memory wheel mounted relative to one of the second rail and first rail, the memory wheel including a plurality of teeth adapted to engage openings in a track mounted relative to the other of the second rail and first rail when the memory module is operated, at least one of the plurality of teeth adapted to support a load to prevent rearward movement of the second rail past the user-selected position, the memory module including a threaded axle attached to the memory wheel and a memory nut that includes a threaded opening adapted to engage the threaded axle;
  wherein the memory nut moves axially along the threaded axle when the seat is moved away from the user-selected location;
  wherein the blocking element comprises a first memory surface mounted relative to the memory nut and a second memory surface mounted relative to the memory wheel, adapted so that the first memory surface is engaged with the second memory surface when the seat is at the user-selected position; and
  wherein the first memory surface is engaged with the second memory surface when the seat is a prescribed distance from the user-selected position.

* * * * *